United States Patent [19]

Minoura et al.

[11] Patent Number: 4,897,590
[45] Date of Patent: Jan. 30, 1990

[54] TRACK ACCESS APPARATUS IN A MAGNETIC RECORDING/PLAYBACK SYSTEM

[75] Inventors: Nobuo Minoura, Yokohama; Katsuo Nakadai, Tokyo; Toshikatsu Harase, Tokyo; Satoshi Iwamatsu, Tokyo, all of Japan

[73] Assignee: Fuji Photo Film Co., Ltd., Kanagawa, Japan

[21] Appl. No.: 272,997

[22] Filed: Nov. 17, 1988

Related U.S. Application Data

[62] Division of Ser. No. 919,140, Oct. 15, 1986, Pat. No. 4,803,573.

[30] Foreign Application Priority Data

| Oct. 15, 1986 | [JP] | Japan | 61-227918 |
| Oct. 15, 1986 | [JP] | Japan | 61-227919 |
| Oct. 15, 1986 | [JP] | Japan | 61-227920 |
| Oct. 15, 1986 | [JP] | Japan | 61-227921 |
| Oct. 15, 1986 | [JP] | Japan | 61-227922 |

[51] Int. Cl.$^4$ ............................................. H02P 8/00
[52] U.S. Cl. ................................... 318/696; 318/685; 400/568; 360/77.02
[58] Field of Search ................ 318/696, 685; 400/568; 360/77.02

[56] References Cited

U.S. PATENT DOCUMENTS

| 4,710,832 | 12/1987 | Itoh | 360/77.02 |
| 4,759,648 | 7/1988 | Kobayashi et al. | 400/568 |

*Primary Examiner*—William M. Shoop, Jr.
*Assistant Examiner*—Saul M. Bergmann
*Attorney, Agent, or Firm*—Lowe, Price, LeBlanc, Becker & Shur

[57] ABSTRACT

Disclosed is an apparatus for gaining high-speed random access to a track in a magnetic recording/playback system of the type in which a magnetic head is shifted to an adjacent track in response to a forward-feed/reverse-feed signal and the head is positioned at the center of this track by tracking control. When the track number of a track to be accessed is designated, the designated track number is compared with a track number at which the magnetic head is presently located. An apparatus is provided for fast-feeding the magnetic head to a track adjoining the designated track on the basis of the comparison, and for subsequently outputting the forward-feed/reverse-feed signal for the purpose of tracking control.

3 Claims, 10 Drawing Sheets

TRACK ACCESS APPARATUS IN A MAGNETIC RECORDING/PLAYBACK SYSTEM

This is a division of application Ser. No. 919,140 now U.S. Pat. No. 4,803,573.

BACKGROUND OF THE INVENTION

1. Field of the Invention

This invention relates to an apparatus for accessing any track in a magnetic recording/playback system of the type in which a magnetic recording/playback head is moved radially of a magnetic recording medium (hereafter referred to as a "magnetic disk") on which a number of circular tracks are concentrically arranged to either record a signal on or playback a signal from a predetermined track.

2. Prior Art Statement

Electronic still video camera systems have recently been developed. These systems combine an imaging device such as a solid state imaging element or image pickup tube with a recorder that employs an inexpensive magnetic disk of a comparatively large storage capacity as a storage medium and operate by electronically imaging a subject, recording a still picture of the subject on the magnetic disk and reproducing the recorded picture by a separately provided television system or printer. A still video signal magnetic recording system in which a still picture recorded on a visible recording medium such as ordinary film or photographic paper is imaged and recorded on a magnetic disk, and a still picture playback system in which a still video signal is read from a magnetic disk and reproduced on a television or the like have also been realized.

In conventional still video magnetic recording/playback systems of this kind, the tracks on the recording disk can be accessed only one track at a time. In other words, a conventional system is provided with forward and reverse switches. Pressing the forward switch once feeds a magnetic head one track inward, and pressing the reverse switch shifts the head one track outward. Accordingly, in order to skip several tracks and access a desired track (which is a form of random access), the forward or reverse switch must be pressed a number of times. This is a troublesome operation. In addition, each time the forward or reverse switch is pressed, the system executes control (referred to as "tracking control") so as to position the magnetic head at the center of the next track. Since this takes times, a fairly long access time is required when such tracking control is performed successively for a plurality of tracks. In particular, tracking is very slow in a magnetic recording/playback system because of so-called "peak finding control", according to which the envelope of a read signal is detected while the magnetic head is moved radially of the magnetic disk, and the magnetic head is positioned at a location where the envelope peaks. Thus there is need of a system capable of making high-speed random access feasible.

In all likelihood there are two approaches that can be taken to realize a high-speed random-access system. One would be to create the system from scratch for the purpose of achieving high-speed random access, and the other would be to add the high-speed random-access function to an already existing system by providing the system with some additional circuitry. The latter approach obviously would serve to hold down development costs and shorten development time.

SUMMARY OF THE INVENTION

An object of the present invention is to provide an existing magnetic recording/playback system with a high-speed random-access function by taking the approach of adding some circuitry to the system.

The present invention finds application in a conventional magnetic recording/playback system of the type having a magnetic recording/playback head provided so as to be freely movable radially of a rotatable magnetic disk on which are provided a plurality of circular, concentrically arranged tracks, a magnetic recording/playback head transfer mechanism, an envelope detector circuit for detecting an envelope of a signal read from the disk by the magnetic recording/playback head, and tracking control means for controlling the magnetic recording/playback head transfer mechanism to move the magnetic recording/playback head in a forward/reverse direction in response to a forward-feed/reverse-feed signal, and to position the magnetic recording/playback head on an adjacent track in the forward/reverse direction based on an output from the envelope detector circuit. According to a characterizing feature of the present invention, the above system is additionally provided with means for designating a track number of a track to be accessed, means for storing a track number of a track at which the magnetic recording/playback head is presently located, fast-feed control means for deciding a direction in which the magnetic recording/playback head is to be fed based on the designated track number and stored track number, and for controlling the magnetic recording/playback head transfer mechanism in such a manner that the magnetic recording/playback head is fed, in the feed direction decided, to a track that is one track short of the designated track, and means for providing the tracking control means with one forward-feed/reverse-feed signal corresponding to the feed direction decided after the control operation performed by the fast-feed control means.

By virtue of the foregoing arrangement, the magnetic recording/playback head is fast-fed to a track adjacent a target track even if the target track designated for access has a track number far from the track number at which the magnetic head is presently located. When the head has reached the adjacent track, a changeover is made to conventional tracking control to position the magnetic head at the center of the target track. This makes possible high-speed random access of any track and enables the head to positioned correctly on the target track. By way of example, tracking control to bring the magnetic head to the adjacent track takes 0.4 sec in conventional systems. Assuming that the magnetic head is fed 50 tracks in a conventional system, it will be necessary to repeat tracking control 50 times, thus requiring 20 sec based on simple calculation. With the present invention, on the other hand, the magnetic head can be fast-fed across 50 tracks in only 0.6 sec and tracking control is performed only once from the adjacent to the target track, thus making it possible to access the target track in 0.6 + 0.4 = 1 sec. It will be appreciated that the invention thus achieves very high-speed random access.

The present invention is applicable not only to a still video playback system but also to a still video recording system. In the latter case, the invention is useful in erasing a still video signal recorded on a predetermined track of a magnetic disk and writing another video signal onto the same track anew.

These and other characterizing features of the present invention will become clear from a description of preferred embodiments with reference to the accompanying drawings.

DESCRIPTION OF THE PREFERRED EMBODIMENTS

In the embodiments that follow, the invention is applied to a system for playing back a still video signal recorded on a magnetic disk. The magnetic disk is provided with plurality (e.g. 50) of circular, concentrically disposed tracks having a track pitch of e.g. 100 μm. Magnetically recorded on each track is a frequency-modulated color still video signal (inclusive of luminance and chrominance signals, etc.) corresponding to one field or one frame. The apparatus has a magnetic playback head freely movable in the radial direction of the magnetic disk for reading the video signals recorded therein and is adapted to sense a designated track on the magnetic disk and to read the still video signal from that track while the disk is rotating.

(1) First Embodiment

[1.1] Electrical configuration of the still video signal playback system

Figure 1:
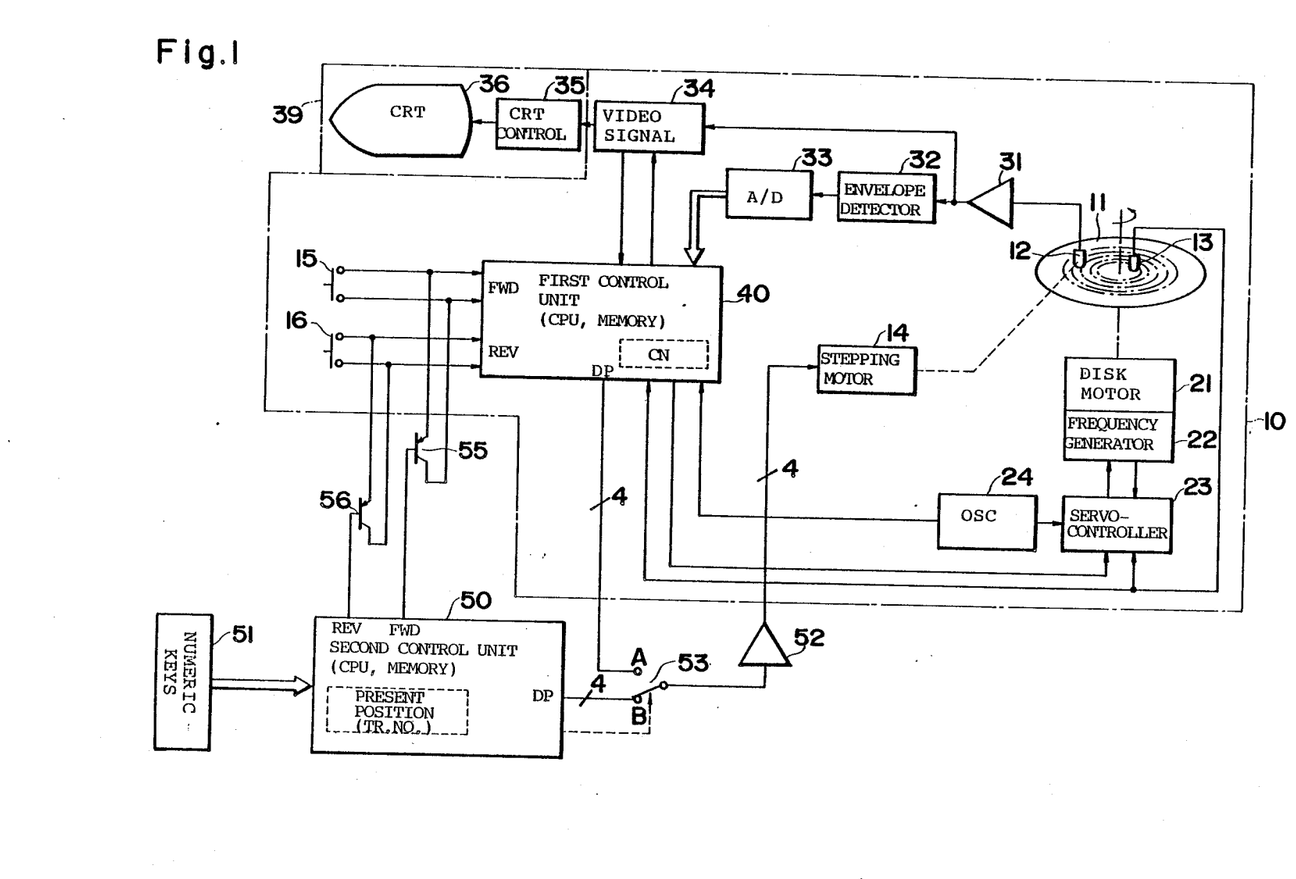
FIG. 1 is a block diagram illustrating the electrical configuration of a first embodiment of the present invention.

FIG. 1 illustrates an example of the electrical configuration of a still video signal playback system. A section 10 enclosed by the broken line is a conventional still video signal playback system. Circuitry other than the section 10 and a color television system 39, namely a second control unit 50, numeric keys 51, a motor drive circuit 52, a changeover switch 53 and switching transistors 55, 56, etc., represent additions made in accordance with the present invention.

A first control unit 40, which is provided in the conventional still video signal playback system 10, executes processing for reading the states of various switches inclusive of a forward switch 15 and reverse switch 16, performs tracking control, described later, and still video signal playback control, and executes alarm and other processing The first control unit 40 comprises a central processor, preferably a microprocessor (hereafter referred to as a "CPU"), a memory for storing a program run by the CPU and necessary data, and an interface for providing a connection to peripheral elements, circuits and devices. The first control unit 40 further includes a counter CN for counting the track number, which is indicative of the magnetic head position when the unit performs ordinary magnetic feed and tracking control other than random-access processing. A prescribed area of the memory may be employed as the counter CN.

Various switches are connected to the first control unit 40. These include the forward switch 15, which is for inputting a command that feeds a magnetic head 12, described below, from the outer side toward the inner side of a magnetic disk 11 by a distance equivalent to one track, and the reverse switch 16, which is for feeding the magnetic head 12 by one track in the direction opposite to that mentioned above. Other switches (not shown) connected to the control unit 40 include a load switch for sensing that a freely openable and closable bucket provided on the system for receiving the magnetic disk 11 has been closed and locked; a pack switch for sensing that the magnetic disk 11 has been received in the closed bucket; a home position switch, described below; and a power supply switch. The on-off states of these switches are read by the first control unit 40 in a key-scan routine, described below. Warning lamps (not shown) are also provided and are lit by a display command from the control unit 40 when prescribed conditions are satisfied. It should be noted that the forward switch 15 and reverse switch 16 can be substituted by keys among the numeric keys 51, described below, and therefore are not absolutely necessary.

When the magnetic disk 11 has been received in the bucket and the bucket has been closed and locked, the disk is thereby mounted on the spindle of a disk motor 21. The magnetic playback head 12 is arranged so as to move freely in the radial direction of the magnetic disk 11 while in contact with the magnetic recording surface of the disk. A phase detector 13 is located in close proximity to the core of the magnetic disk 11 for generating a single pulse with every revolution of the magnetic disk 11 upon detecting a magnetic body or the leakage flux from a permanent magnet for chucking provided in the core.

The disk motor 21 is provided with a frequency generator 22 for generating a signal of a frequency proportional to the rotational speed of the motor 21. The frequency signal outputted by the generator 22 is fed back to a servocontrol circuit 23. The output pulses from the phase detector 13 are also applied to the servocontrol circuit 23 and to the control unit 40. A reference clock pulse generator 24 generates a reference signal having a frequency of 60 Hz, which is the same as the field frequency of a raster scan video signal recorded on the magnetic disk 11. This signal is applied to the servocontrol circuit 23. The generator 24 also supplies the control unit 40 with high-speed (e.g. 3.58 MHz) clock pulses. On the basis of these input signals applied thereto, the servocontrol circuit 23 controls the motor 21 so that it will rotate at a constant speed of, e.g. 3600 rpm, and so that a constant rotational phase will be obtained. The servocontrol circuit 23 also responds to commands from the control unit 40 to start and stop the motor 21.

A transfer drive unit, which includes the stepping motor 14, is provided for supporting the magnetic head 12 in such a manner that the head 12 may travel freely radially of the magnetic disk 11, and for controlling the travel of the head 12 radially of the disk. Though control of the stepping motor 14 for transferring the magnetic head 12 will be described in detail below, it may be mentioned now that the stepping motor 14 is supplied by the drive circuit 52 with drive pulses in four phases A, $\overline{A}$, B, $\overline{B}$. A drive pulse DP is generated by either the first control unit 40 or second control unit 50 and is applied to the drive circuit 52 through the changeover switch 53. The traveling direction of the magnetic head 12 is decided by the direction in which the stepping motor 14 rotates, and the distance traveled by the magnetic head 12 is proportional to the angle through which the motor rotates. By way of example, for each single shift pulse applied to drive the stepping motor, the motor rotates through about 30°, whereby the magnetic head 12 is shifted by about 8.4 μm. Accordingly, the magnetic head 12 will be moved by approximately one track (100 μm) by applying 12 shift pulses to drive the stepping motor 14.

Figure 2:
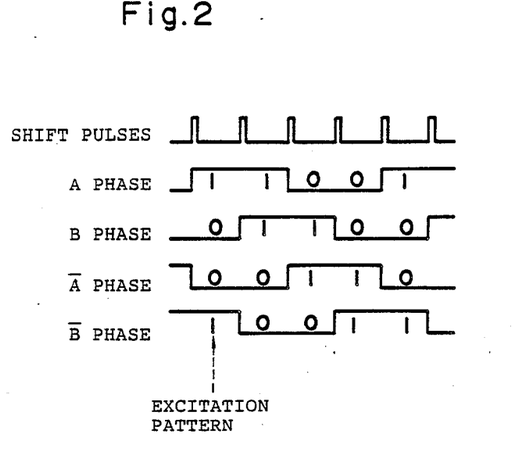
FIG. 2 is a waveform diagram illustrating four-phase drive pulses and excitation patterns of a stepping motor.

A single shift pulse referred to here is that which effects a single change in an excitation pattern based on four-phase drive signals comprising phases A, $\overline{A}$, B, $\overline{B}$, as illustrated in FIG. 2. In a case where the magnetic held 12 is fed in the forward direction, the excitation pattern changes in the manner 1001 → 1100 → 0110 → 0011 each time the one shift pulse is generated. When the magnetic head 12 is fed in the reverse direction, the excitation pattern changes in a sequence which is the reverse of the above. Though the four-phase drive pulses can be generated by hardware using the shift pulses as clock pulses, it is also possible to generate the drive pulses by a program run by the CPU in the first control unit 40. For this reason, there are cases where the shift pulses do not actually exist. For descriptive purposes, however, the concept of the shift pulses is employed herein.

The magnetic head 12 serves to read a still video signal recorded on a track of the magnetic disk 11 at which the head 12 has been positioned. Since the magnetic disk 11 is rotated at a constant 3600 rpm in the illustrated embodiment, the magnetic head 12 plays back a video signal corresponding to one track, namely a frequency-modulated video signal of one field, every revolution, i.e., every 1/60 of a second. This is to establish compatibility with a standard color television system, such as the NTSC system, upon demodulation.

The playback output of the magnetic head 12 is fed into a video signal processing circuit 34 and the envelope detector circuit 32 after being amplified by a pre-amplifier 31. The video signal processing circuit 34 subjects the video signal read by the magnetic head 12 to signal processing to produce a composite video color signal in e.g. an NSTC format. The processing circuit 34 also functions to extract a vertical synchronizing signal VSYNC from the demodulated NTSC-format composite color video signal and deliver it to the control unit 40. The circuit 34 responds to a signal MUTE from the control unit 40 by performing a muting operation by blanking the scanning interval of the video signal.

The color still video signal outputted by the circuit 34 is applied to the color television system 39, which has a cathode-ray tube display (hereafter referred to as a "CRT") 36 and a CRT control circuit 35. Thus, a still video signal recorded on the magnetic disk 11 appears visually on the screen of the CRT 36.

The envelope detector circuit 32 detects the envelope of the signal read by the magnetic head 12, namely the envelope of the frequency-modulated video signal recorded on a track of the magnetic disk 11, and outputs a voltage signal conforming to the detected envelope. This voltage signal representing the envelope is fed into an analog/digital (A/D) converter 33, which proceeds to convert the signal into an eight-bit digital signal representing a quantization level of e.g 256. This signal enters the control unit 40.

The envelope detection signal is used to search for tracks on the magnetic disk 11. Specifically, a position at which the detection signal peaks when the magnetic head 12 is moved in the radial direction of the magnetic disk 11 is the center of a track on which a video signal has been recorded. On the basis of this eight-bit digital signal received from the A/D converter 33, the control unit 40 controls the magnetic head transfer drive unit to position the magnetic head 12 at the center of a prescribed track. This is the tracking control operation referred to earlier.

The second control unit 50 added to the above system in accordance with the present invention also comprises a CPU (preferably a microcomputer), a memory for storing a program run by the CPU as well as the necessary data and an interface for providing a connection to peripheral elements, circuits and devices. The memory has an area for storing the present position (track number) of the magnetic head 12.

The abovementioned switches, inclusive of those not shown, are also connected to the second control unit 50, and the latter also executes a key scanning routine. Depending upon the switch states read in accordance with the key scanning routine, the second control unit 50 controls the first control unit 40. In other words, the second control unit 50 is placed above the first control unit 40 in rank.

The numeric keys 51 are for inputting the number of the track to be accessed, namely the target track number. The inputted signal indicative of this track number enters the second control unit 50. In response, the second control unit 50 executes fast-feed processing, described below, and outputs a requisite number of drive pulses for the stepping motor 14. When the fast-feed processing ends, the second control unit 50 outputs a forward-feed or reverse-feed signal. The switching transistors 55, 56 are turned on by these signals. The transistors 55, 56 are connected in parallel with the forward and reverse switches 15, 16, respectively. Accordingly, when the transistor 55 is turned on by the forward-feed signal outputted by the second control unit 50, an effect equivalent to that obtained by pressing the forward switch 15 is communicated to the first control unit 40. If the reverse-feed signal is outputted, the effect produced is the same as if the reverse-feed switch 16 were pressed.

Figure 3:
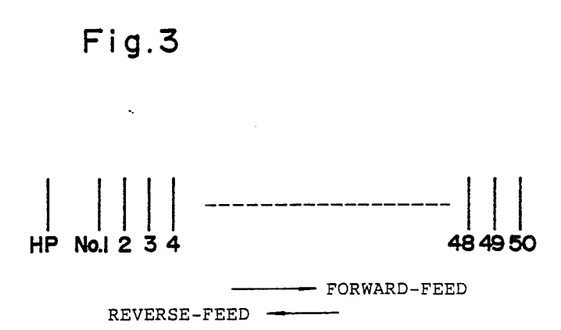
FIG. 3 is a view showing the track arrangement and home position of a magnetic disk.

FIG. 3 illustrates the relationship between the tracks provided on the magnetic disk 11 and a home position HP (an origin position or a stand-by position) of the magnetic head 12. The 50 tracks are circular and concentrically disposed on the magnetic recording surface of the magnetic disk 11 and are numbered consecutively from No. 1 to No. 50 starting from the outer side of the disk. The home position HP, which situated on the outer side of track No. 1, is not attached to the magnetic disk 11 but is a limit position assigned to the path along which the magnetic head 12 travels. The home position HP is sensed by a home position switch mentioned above. Transfer of the magnetic head from the outer to the inner side of the magnetic disk 11 is forward feed, and transfer of the head in the opposite direction is reverse feed.

[1.2] Principle of High-Speed Random Access

Figure 4:
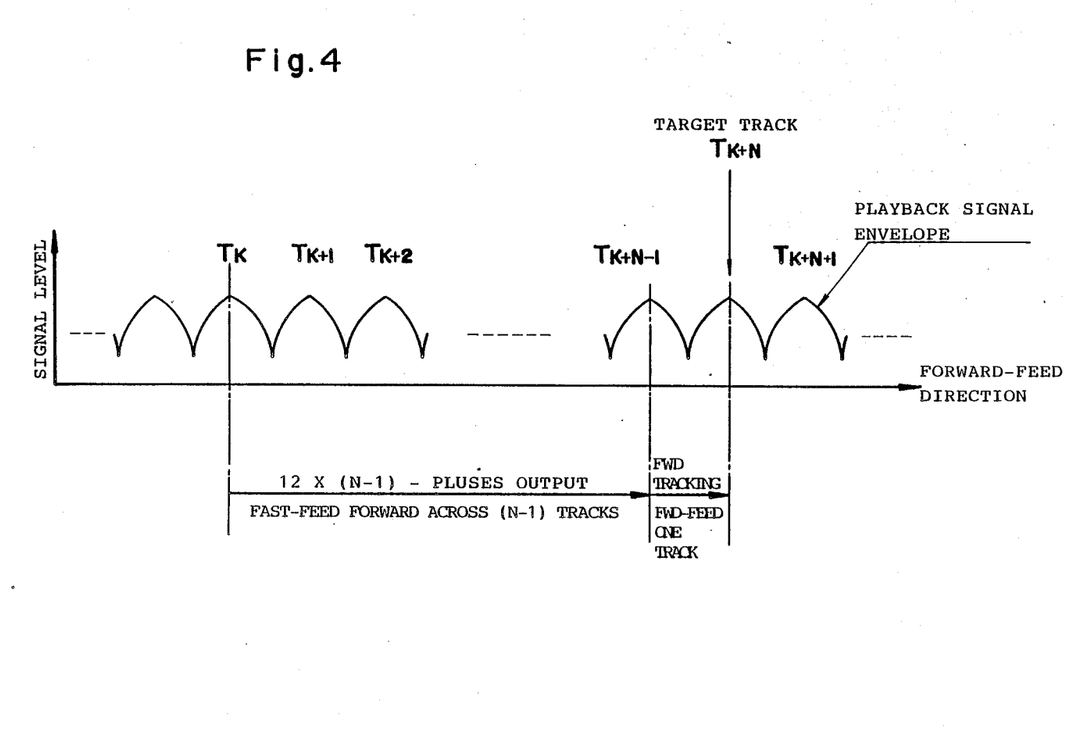
FIG. 4 is a view useful in describing the principle of track random access according to the present invention.

FIG. 4 illustrates the principle according to which any track on the magnetic disk 11 is randomly accessed at high speed in accordance with the present invention.

Assume that the magnetic head 12 is at the position of Track No. $T_K$, and that Track No. $T_{K+N}$ is inputted by the numeric keys 51 as the target track to be accessed. For the time being, we will consider that $N \geq 2$ holds.

First, fast-feed in the forward direction is performed across $(N-1)$ tracks up to a track one ahead of the target track of number $T_{K+N}$. Since the magnetic head 12 is shifted one track by applying 12 of the shift pulses to the stepping motor 14, the stepping motor 14 is supplied with $12 \times (N-1)$ of the shift pulses. This will cause the magnetic head 12 to be fast-fed up to Track No. $T_{K+N-1}$. The fast-feed operation is performed under the control of the second control unit 50.

Following the above, the second control unit 50 applies the forward-feed signal to the first control unit 40. In response, the first control unit 40 performs ordinary forward-feed tracking control to move the magnetic head 21 in the forward direction up to the adjacent track (Track. No. $T_{K+N}$) and position the head at the center of this track.

In a case where $N \leq -2$ holds, the second control unit 50 performs fast-feed in the reverse direction and then applies the reverse-feed signal to the first control unit 40, in response to which the latter performs reverse-feed tracking to feed the magnetic head 12 one track in the reverse direction.

If $N=1$ or $-1$ holds, the fast-feed operation performed by the second control unit 50 is unnecessary; only forward- or reverse-feed tracking executed by the first control unit 40 is carried out.

If $N=0$, shifting the magnetic head 12 is unnecessary and no processing is executed.

[1.3] High-Speed Random-Access Processing

Let us first describe forward- and reverse feed tracking control performed by the first control unit 40. This control operation includes initial tracking processing and both forward-feed control and reverse-feed control processing.

Initial tracking processing is performed when a reset signal is provided by the second control unit 50. The reset signal is applied to the first control unit 40 when the power supply of the system is turned on, when the magnetic disk is received in the bucket, or when the second control unit 50 decides that it is necessary, etc. The first control unit 40 performs key scanning at a fixed period as mentioned above. However, the arrangement is such that for prescribed switches (the power supply switch, load switch, pack switch, etc.), these switches are connected to e.g. ground at times other than when they are being subjected to key scanning by the second control unit 50, so that a change in the state of these switches cannot be detected by the key scanning operation performed by the first control unit 40.

In initial tracking processing, first the magnetic head 12 is returned to the home position HP, then the head 12 is fed in the forward direction from the home position HP and is made to search for the center of Track No. 1, where the magnetic head 12 is finally positioned. This causes the track number counter CN to record a count of 1. In order for the count in the counter CN to be advanced so as to assume suitable values ranging from 2 to 49, the second control unit 50 outputs the forward-feed signal and the changeover switch 53 is connected to side B. As a result, the drive pulses DP outputted by the first control unit 40 do not reach the stepping motor 14, so that only the counter CN is incremented without actually moving the magnetic head 12. By repeating this motionless feed in the forward direction a number of times, the value recorded by the counter CN will be set to one of the abovementioned suitable values. The technical significance of this will be described later.

Figure 5:
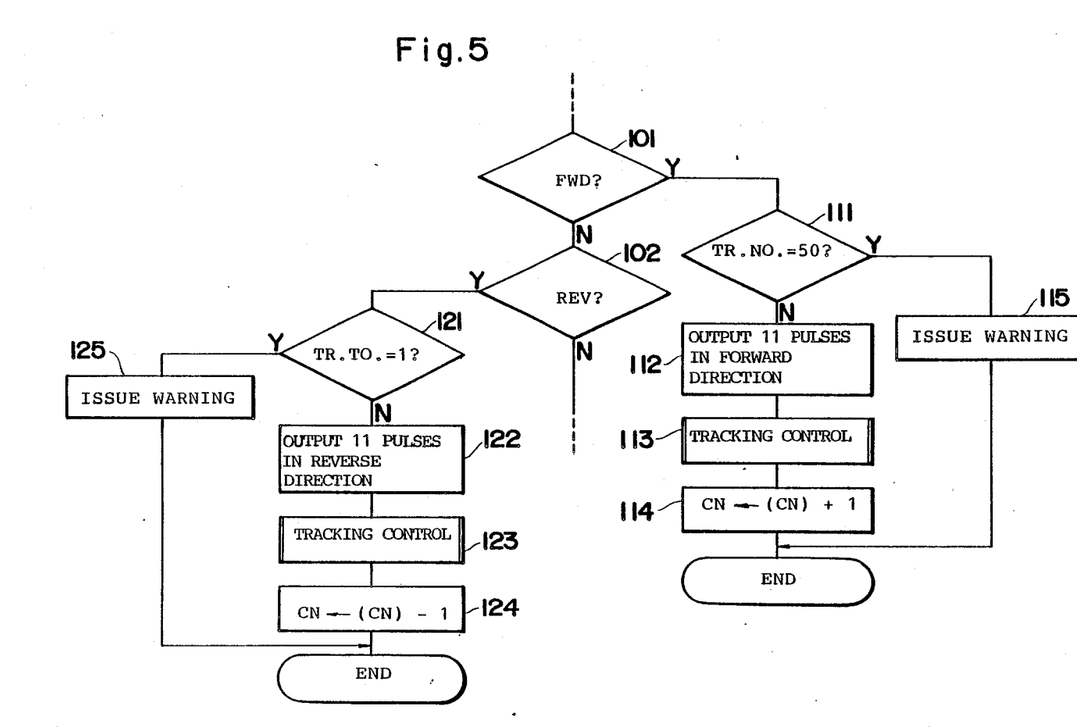
FIG. 5 is a flowchart illustrating a conventional processing procedure in a first control unit.

FIG. 5 is a flowchart conceptually illustrating the general features of forward- and reverse-feed processing and tracking processing.

The first control unit 40 senses the state of the forward-feed signal (switch 15), the state of the reverse-feed signal (switch 16) and the like at a constant period. As a result, when the forward-feed signal is sensed (YES at a step 101), the following forward-feed and tracking processing is executed:

If the value in the track number counter CN is not 50 (NO at a step 111), a change in the drive pulses corresponding to 11 forward shift pulses is communicated to the stepping motor 14 (step 112) (by connection of the changeover switch 53 to the A side) in order to transfer the magnetic head forwardly up to the vicinity of the center of the next adjacent track. At this time the first control unit 40 reads in the output of the envelope detector circuit 32. An additional forward shift pulse is then issued and the envelope level is sensed in the same manner. If there is no significant difference between the envelope level just sensed and that sensed last, then the envelope level in the vicinity is searched a number of times while the feed direction of the magnetic head 12 is changed back and forth in the forward and reverse directions. Once it has been confirmed that no significant difference exists between envelope levels, the position at which this condition prevails is judged to be the center of a track and it is here that the magnetic head 12 is positioned. When a significant different is found to exist between the present and immediately preceding envelope levels, the magnetic head 12 is moved toward the higher envelope level by an amount equivalent to one shift pulse and the foregoing processing is repeated. These operations constitute tracking control processing at a step 113.

It should be noted that if the envelope level is below a predetermined threshold level, a decision is rendered to the effect that a still video signal has not been recorded on this track.

At the end of tracking control of step 113, the value in track number counter CN is incremented by 1.

When the count in the track number counter CN attains a value of 50, forward feed is no longer possible. Accordingly, a warning process step 115 is executed to light a warning indicator, sound a buzzer or the like.

In a case where the reverse-feed signal is sensed (YES at a step 102), processing similar to that just described above is executed (steps 122, 123) for the reverse-feed direction. The counter CN is decremented at a step 124. Note that if $CN=1$ holds, warning processing is executed (steps 121, 125).

Next, let us describe processing performed by the second control unit 50. This processing includes reset processing and random-access processing.

According to reset processing, a present position storage area in the internal memory of the second control unit 50 is placed in a reset state, namely a state in which Track No. 1 is stored in the area as the present position. This processing starts when an input is made by a reset key among the numeric keys 51, when the magnetic disk 11 is changed, when the power supply is turned on, and at certain other times. The second control unit 50 sends a reset signal to the first control unit 40, which responds by performing the above-described initial tracking processing to position the magnetic head 12 at Track No. 1. Further, Track No. 1 is set in the present position storage area of the memory in second control unit 50. Thereafter, the count in the track number counter CN of the first control unit 40 is set to a suitable value between 2 and 49 by repeatedly transmitting the forward-feed signal in the manner described above.

Figure 6A:
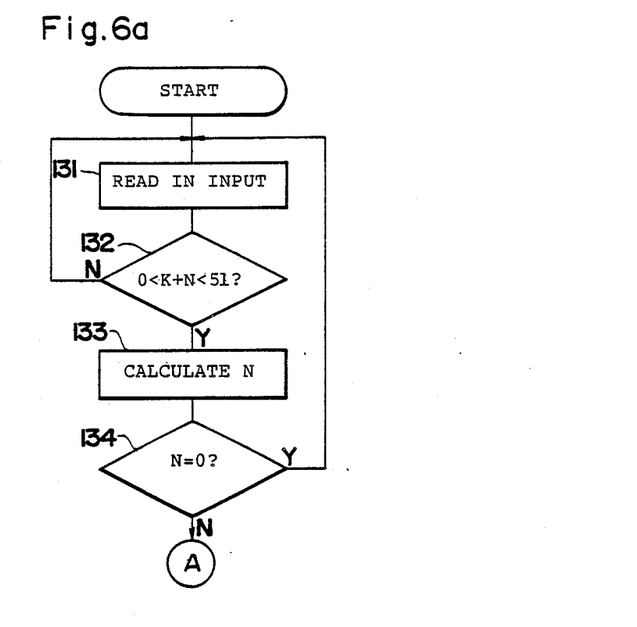
FIGS. 6a and 6b are flowcharts illustrating a random-access processing procedure performed by a second control unit in the first embodiment.
Figure 6B:
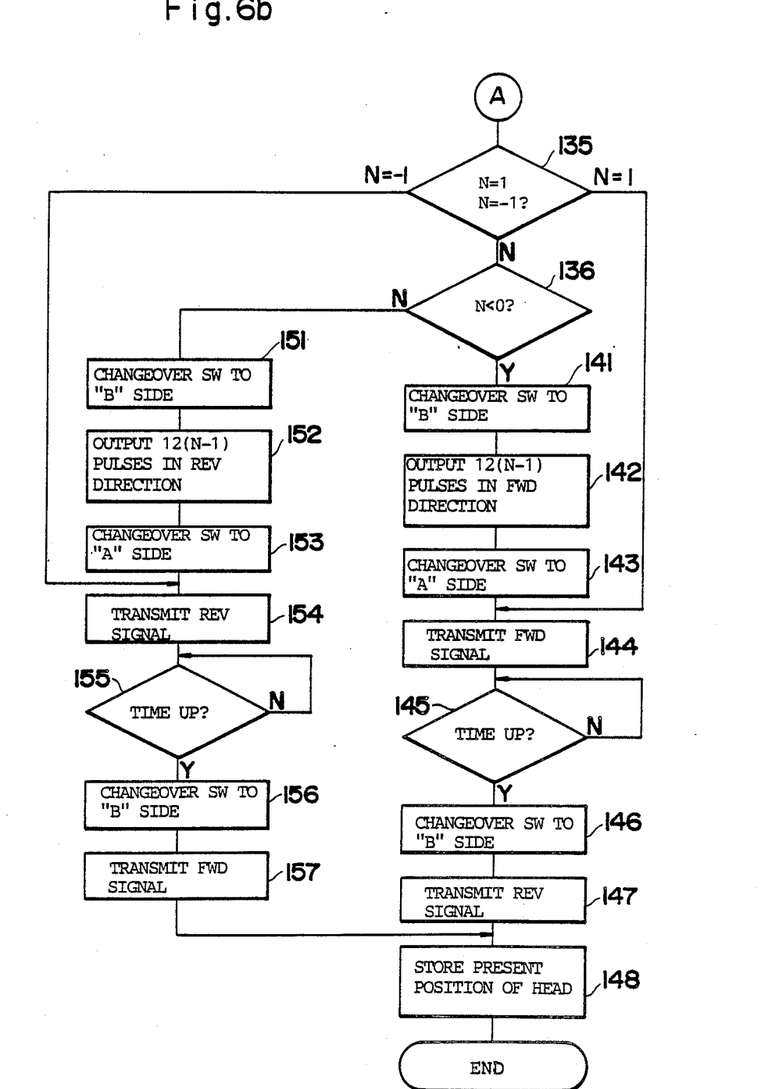

FIGS. 6a and 6b illustrate the general features of random-access processing performed by the second control unit 50. We will assume that K has been stored as the track number in the present position storage area.

When a value (K+N) is inputted from the numeric keys 51 as the target track number to be accessed, the second control unit 50 reads in this value at a step 131 and then checks whether the number is between 1 and 50 at a step 132. If the number is within this range of values, then the second control unit 50 executes an arithmetic operation, namely (K+N)−K, to subtract the track number in the present position storage area from the inputted track number, and checks whether the result N is zero (steps 133, 134).

If the inputted track number is not within the range 1–50, or if the result N of the subtraction operation is zero, no processing is executed.

Next, the program proceeds to a step 135, at which the second control unit 50 determines whether N=1, N=−1 or some other value. If N≧2 or N≦−2 is found to hold, then it is checked whether N>0 or N<0 holds at a step 136. When N>0 is the case, the program proceeds to random-access processing in the forward direction; when N<0 holds, the program proceeds to random-access processing in the reverse direction.

According to forward-direction random-access processing, the first step (step 141) is to connect the changeover switch 53 to the B side. In order for the magnetic head 12 to be shifted (N−1) tracks in the forward direction, the second control unit 50 outputs drive pulses corresponding to 12 × (N−1)-number of the shift pulses and these drive pulses are applied to the stepping motor 14 via the switch 53 and drive circuit 52 (step 142).

When this has been accomplished, the changeover switch 53 is switched over to the A side at a step 143 and the second control unit 50 applies the forward-feed signal to the first control unit 40 at a step 144. In response, the first control unit 40 starts forward-direction tracking processing (steps 101, 111–114) illustrated in FIG. 5 to move the magnetic head 12 in the forward direction to the next adjacent track and position the head at the center of this track. As a result, the magnetic head 12 is fed up to the inputted target track (K+N) and is positioned at the center of this track.

Upon passage of a prescribed period of time during which forward-direction tracking processing performed by the first control unit 40 should be completed, the changeover switch 53 is switched over to the B side again (steps 145,146). Note that it is permissible to sense the drive pulses outputted by the first control unit 40 rather than execute the processing of step 145. The changeover switch 53 may then be changed over when the drive pulses stop being delivered.

Next, the second control unit 50 issues the reverse-feed signal and applies this signal to the first control unit 40 at a step 147. The first control unit 40 responds by executing reverse-direction tracking processing (steps 102, 121–124) illustrated in FIG. 5. Since the switch 53 is connected to the B side, the drive pulses outputted by the first control unit 40 are not applied to the stepping motor 14 and, hence, the magnetic head 12 does not actually move. Since it is decided that there is no significant difference between the present and last envelope levels in the tracking control of step 123 in FIG. 5, reverse-feed tracking processing ends normally on the first control unit side.

This is followed by a step 148, at which the inputted value (K+N) is stored in the present position storage area of the second control unit 50 as the track number at which the magnetic head 12 is presently located.

Reverse-direction random-access processing, which is constituted by steps 151–157 and 148, is executed in a manner similar to forward-direction random-access processing described above. The only differences are: (1) in step 152, drive pulses of a number corresponding to 12 × (N−1) shift pulses in the reverse direction are delivered; (2) in step 154, the reverse-feed signal is delivered; and (3) in step 157, the forward-feed signal is delivered.

When N=1 is determined to hold at the step 135, the fast-feed operation performed by the second control unit 50 is unnecessary, so the program skips steps 141–143 and proceeds to step 144, at which the forward-feed operation is carried out by the first control unit 40. When N=−1 holds at step 135, the program skips steps 151–153 and proceeds to step 154.

[1.4] Fixing the counted value in track number counter CN

When forward-direction random-access processing is performed in the flowchart of FIG. 6b, the forward-feed signal is applied to the first control unit 40 to carry out forward tracking (step 144). Further, the reverse-feed signal is applied to the first control unit 40 to carry out artificial reverse tracking (step 147). The same holds for reverse random-access processing (steps 154, 157). The purpose of this is to fix the value in the track number counter CN of first control unit 40.

When forward-feed processing is executed by the first control unit 40 in the manner set forth above, the track number counter CN is incremented by 1; when reverse-feed processing is executed, the counter CN is decremented by 1 (steps 114, 124 in FIG. 5). Accordingly, a problem now to be described would arise if the processing of steps 147, 157 were not provided in the flowchart of FIG. 6b.

Figure 7:
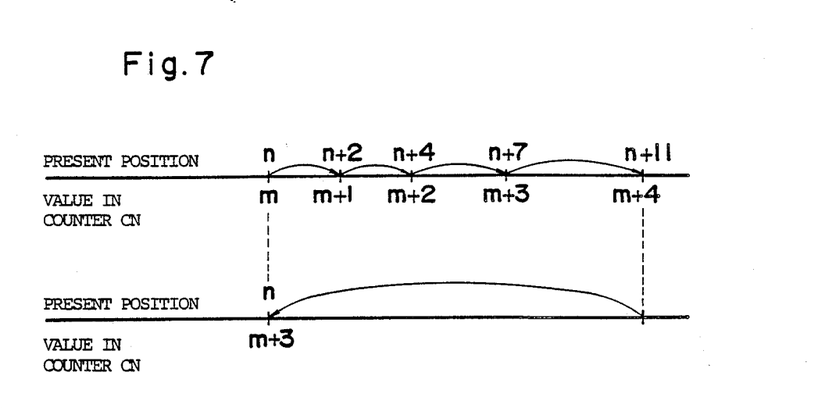
FIG. 7 is a view useful in describing the necessity of fixing a track number counter in the first control unit.

Let us describe the problem with reference to FIG. 7. Assume that the present position of the magnetic head 12 is Track No. n, and that the value in the track number counter CN is m. When (n+2) is inputted from the numeric keys 51 so that forward-direction random access is carried out, the present position becomes (n+2) and the value in counter CN becomes (m+1). Next, if Track No. (n+4) is randomly accessed, the present position becomes (n+4) and the value in counter CN becomes (m+2). If such piecemeal forward-direction random access is repeated four times to make the present position (n+11), the value in counter CN becomes (m+4). If Track No. n is subsequently designated by the numeric keys 51 so that reverse-direction random access is performed, the present position returns to n but the value in counter CN is restored only to (m+3).

If the above-described operation is repeated a number of times, the value in counter CN gradually increases and eventually reaches 50. When this occurs, forward-feed processing is no longer capable of being carried out (steps 111, 115 in FIG. 5).

The same problem arises if the value in counter CN gradually decreases. When the value reaches 1, reverse-feed processing becomes impossible (steps 121, 125 in FIG. 5).

The following measures are taken to avoid the occurrence of such a situation. Specifically, in the case of forward-direction random access in the processing of FIG. 6b, after the forward-feed signal is applied to the first control unit 40 to carry out forward feed (step 144, where the value in counter CN increases by 1), the reverse-feed signal is applied to the first control unit 40 to perform motionless reverse feed (step 147, at which the value in counter CN decreases by 1), thereby fixing the value of the count in counter CN. Operation is the same in the case of reverse-direction random access as well.

It is required that the value in the track number counter CN within first control unit 40 be preset to a suitable value between 2 and 49. To this end, motionless forward feed is performed from 1 to 48 times in the reset processing (initial tracking processing) to set the count in counter CN to a suitable value in the range 2–49.

(2) Second Embodiment

Figure 8:
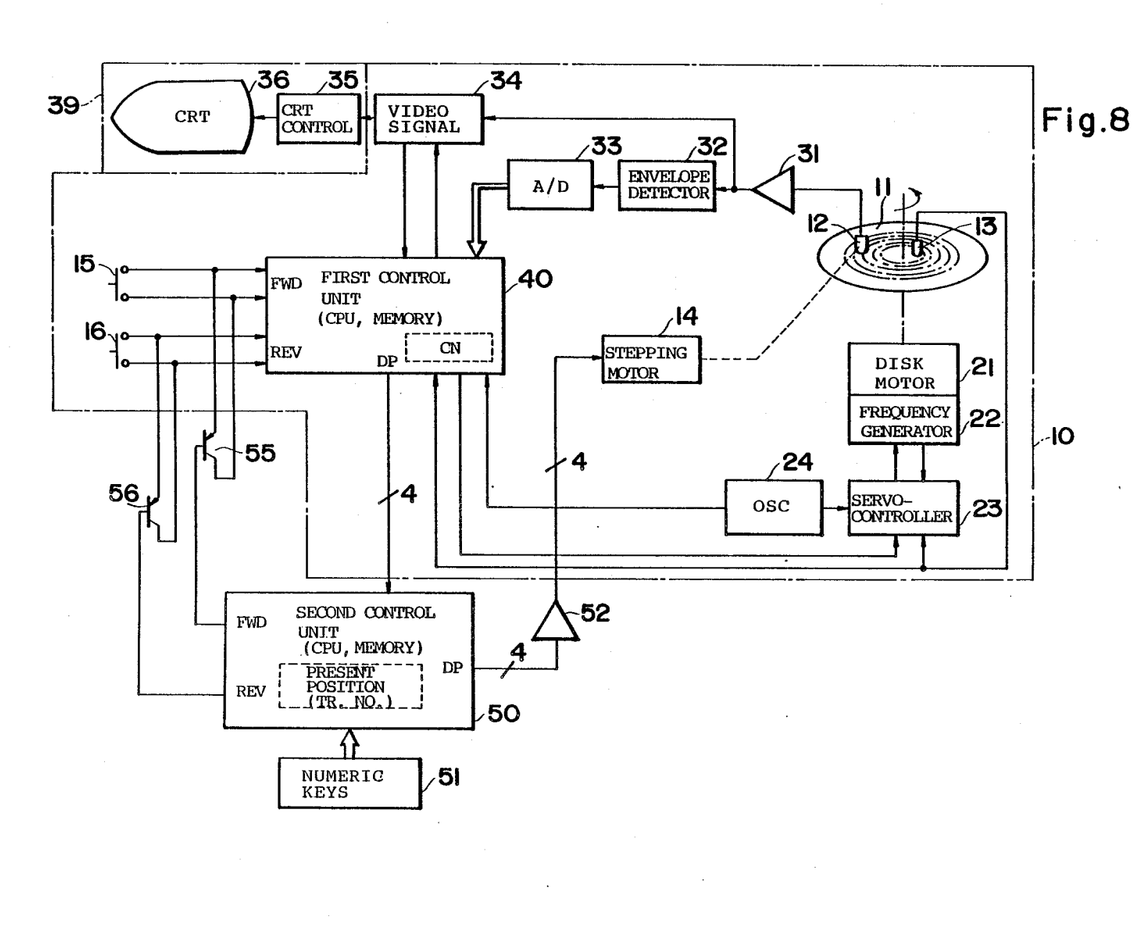
FIG. 8 is a block diagram illustrating an electrical configuration common to both second and third embodiments of the present invention.

FIG. 8 illustrates the electrical configuration of a second embodiment of the present invention. This arrangement is not provided with the changeover switch 53. The four-phase drive pulses DP outputted by the first control unit 40 are applied to the second control unit 50, and all drive pulses for fast-feed, forward-feed and reverse-feed processing are delivered to the stepping motor 14 from the second control unit 50. In other aspects the arrangement is the same as that shown in FIG. 1.

Figure 9:
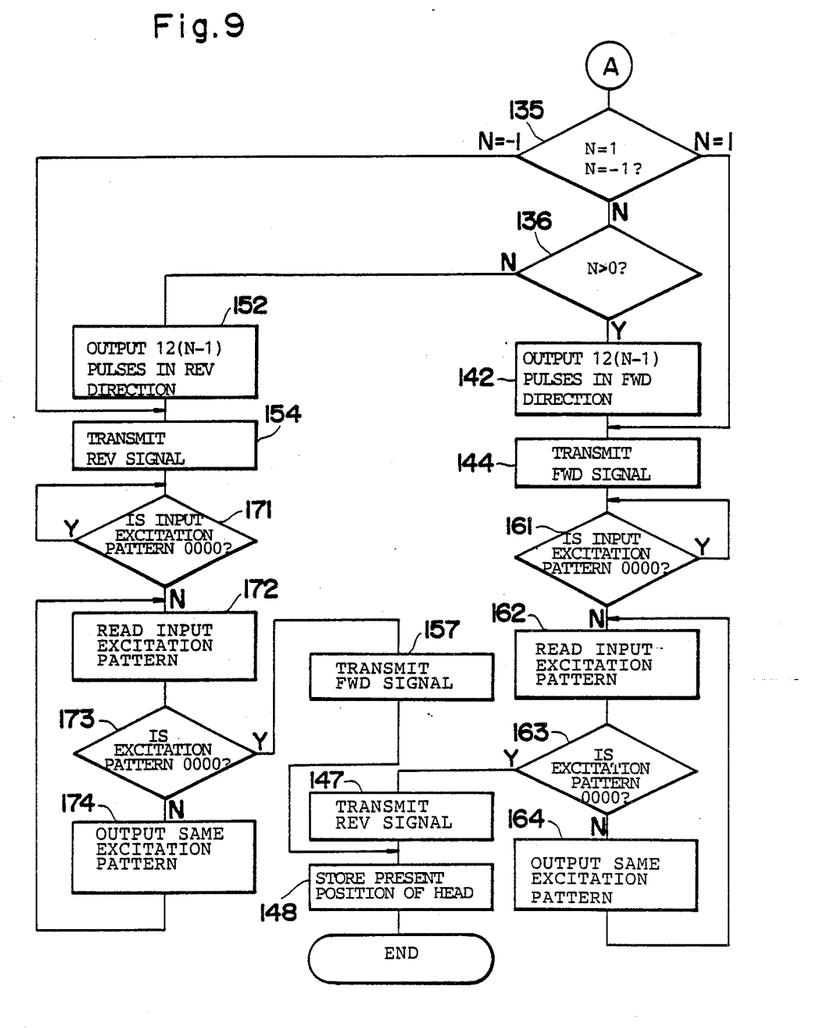
FIG. 9 is a flowchart illustrating a random-access processing procedure in the second embodiment.

FIG. 9 is a flowchart of processing performed by the second control unit 50 in the second embodiment of the invention.

The steps 131–134 of FIG. 6a are applied in similar fashion in the second embodiment. For this reason, these steps are deleted from the flowchart of FIG. 9. Further, process steps in FIG. 9 identical with those in FIG. 6b are designated by like reference numerals.

Let us begin with forward-direction random access. In order for the magnetic head 12 to be fast-fed (N−1) tracks, the second control unit 50 outputs drive pulses corresponding to 12 × (N−1)-number of the shift pulses (step 142), as in the first embodiment, whereby the magnetic head 12 is shifted to a track that is adjacent to and one track short of the target track.

The second control unit 50 applies the forward-feed signal to the first control unit 40 at step 144. In response, the first control unit 40 starts forward-direction tracking processing and outputs a series of drive pulses. The second control unit 50 receives these drive pulses and delivers them as such to the stepping motor 14. The processing is executed in a manner which will now be described.

First, it is determined at a step 161 whether the excitation pattern of drive pulses applied from the first control unit 40 to the second control unit 50 is 0000. The excitation patterns are those in which the A, $\bar{A}$, B, $\bar{B}$ phases, described with reference to FIG. 2, exhibit states of 1001, 1100, 0110, 0011. An excitation pattern of 0000 means that drive pulses have not yet been outputted by the first control unit 40. Accordingly, the processing of step 161 entails waiting from drive pulses from the first control unit 40 after transmission of the forward-feed signal.

When drive pulses for forward-feed processing are eventually outputted by the first control unit 40 (NO at step 161), the second control unit 50 reads the prevailing excitation pattern (step 162) and provides the drive circuit 52 of the stepping motor 14 with drive pulses having the same excitation pattern (164). This is equivalent to permitting the drive pulses produced by the first control unit 40 to pass intact through the second control unit 50.

By repeating this processing, forward-feed tracking proceeds until the magnetic head 12 is positioned at the center of the target track, whereupon the first control unit 40 ceases issuing the drive pulses. In consequence, the excitation pattern read by the second control unit 50 becomes 0000 (YES at a step 163).

This is followed by delivering the reverse-feed signal to the first control unit 40 (step 147) and setting the target track number in the memory of second control unit 50 as the present position of the magnetic head (step 148). In the motionless reverse-feed processing corresponding to the step 147, drive pulses are delivered from the first control unit 40 to the second control unit 50. However, the second control unit 50 ignores these entering drive pulses and does not deliver the drive pulses to the stepping motor 14. This enables the motionless reverse-feed to take place.

Reverse-direction random-access processing differs only slightly, with the processing of steps 152, 154, 157 being the same as the identical steps in the first embodiment; basically, the processing is the same as that of forward-direction random-access processing set forth above.

(3) Third Embodiment

As shown in FIG. 2, the drive pulse excitation pattern applied to the stepping motor 14 changes constantly in a certain sequence, as a result of which the stepping motor 14 is rotated smoothly. In both the first and second embodiments, however, the drive pulses for fast-feed are generated by the second control unit 50 and the drive pulses for forward- or reverse-feed processing carried out after fast-feed are generated by the first control unit 40. Accordingly, the final excitation pattern in fast-feed processing and the initial excitation pattern in forward- or reverse-feed processing will not necessarily have the relationship indicated by the above-mentioned sequence; in many cases, the change in the excitation pattern is discontinuous when the changeover is made between these two types of processing. When this occurs, there is the danger that the stepping motor 14 will rotate suddenly through an excessively large angle or that the motor will rotate through a certain angle in the reverse direction even though forward feed is being attempted. This can have unfortunate consequences. For example, in the case where the stepping motor is rotated in the reverse direction, the magnetic head 12 will not reach the vicinity of the envelope level peak at the target track even after the first 11 shift pulses are issued in forward- or reverse-feed processing, and hence there is the possibility that the envelope level read at such time will be below the predetermined threshold level. If this happens, the first control unit 40 will wrongly conclude that a video signal has not been recorded on the target track.

To preclude this possibility, the third embodiment is arranged to match or coordinate the phases between the drive pulses from the second control unit 50 and the drive pulses from the first control unit 40.

Figure 10A:
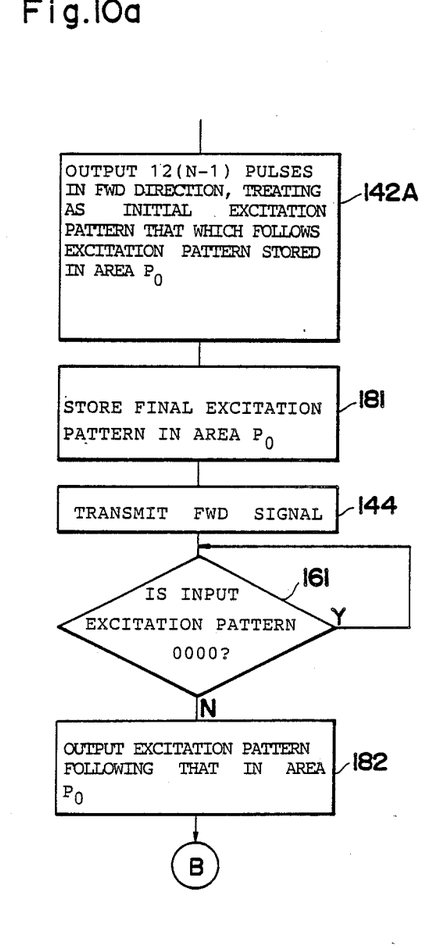
FIGS. 10a and 10b are flowcharts illustrating a random-access processing procedure in the third embodiment.
Figure 10B:
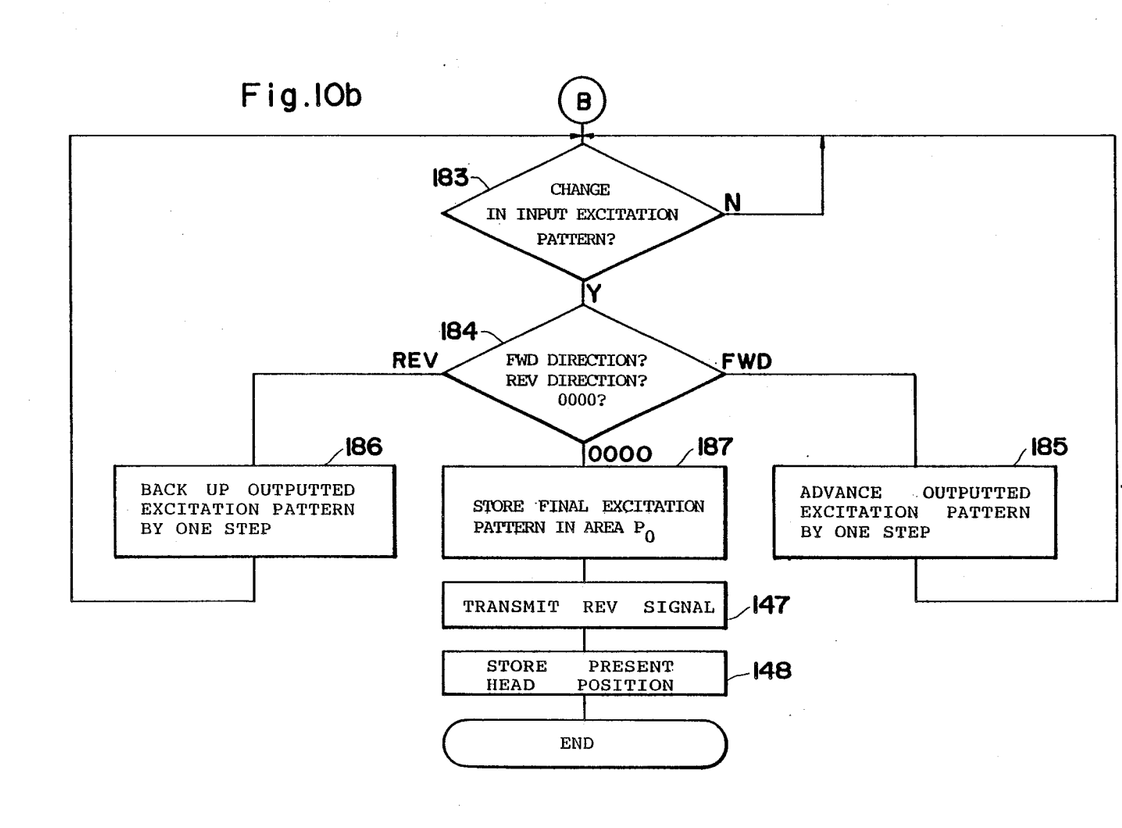

Phase-match processing executed for forward-direction random access is illustrated in FIGS. 10a, 10b. In FIGS. 10a, 10b, process steps identical with those shown in FIG. 9 are designated by like reference numerals.

The memory of the second control unit 50 is provided with an area $P_0$ for storing the output excitation pattern. Stored in area $P_0$ at a step 187 is the final excitation pattern outputted by the second control unit 50 in the preceding cycle of processing.

When forward-direction random access is determined to be in effect (YES at the step 136 in FIG. 9), the program proceeds to the processing illustrated in FIGS. 10a, 10b, the excitation pattern succeeding the excitation pattern stored in the area $P_0$ (namely an excitation pattern advanced by one step in the forward direction) is treated as being the first, and drive pulses corresponding to $12 \times (N-1)$ shift pulses in the forward direction are outputted by the second control unit 50 (step 142A). By way of example, if the excitation pattern stored in area $P_0$ is 1001 (see FIG. 2), the excitation pattern outputted first at the step 142A will be 1100, then 0110, and then 0011. This is the order in which the drive pulses will be outputted. As a result of this processing, the stepping motor 14 will begin to be rotated smoothly in the forward direction from the angular position at which it came to rest at the and of the preceding cycle of processing.

When the magnetic head 12 finishes being fed $(N-1)$ tracks in the forward direction, the excitation pattern of drive pulses outputted last as a result of this feed processing is stored in the area $P_0$ (step 181).

Next, the second control unit 50 sends the forward-feed signal to the first control unit 40 (step 144), after which the second control unit 50 waits for the first control unit 40 to begin forward-feed processing (step 161).

When the first control unit 40 starts forward-feed processing, the first control unit 40 provides the second control unit 50 with an excitation pattern of drive pulses other than the pattern 0000 and, hence, a NO answer is obtained at the step 161. This is followed by a step 182, at which the second control unit 50 provides the stepping motor 14 with drive pulses in an excitation pattern that follows the excitation pattern stored in the area $P_0$, irrespective of the excitation pattern of drive pulses entering the second control unit 50 from the first control unit 40. The program then proceeds to a step 183, at which monitoring is performed to determine whether a change has occurred in the excitation pattern of drive pulses arriving from the first control unit 40.

Thus, as set forth above, in accordance with forward-feed processing, the first control unit 40 proceeds to perform tracking control after issuing drive pulses equivalent to 11 shift pulses in the forward direction, and searches for the peak of the envelope while rotating the stepping motor 14 in the forward and reverse directions in dependence upon the output of the envelope detector circuit 32. Accordingly, though the excitation pattern of drive pulses outputted by the first control unit 40 varies in the forward direction until at least the first 11 pulses, the pattern changes in either the forward or reverse direction from that point onward.

In any case, the second control unit 50 monitors the change in the excitation pattern arriving from the first control unit 40. If there is any change in the pattern, then whether the change is in the forward direction or reverse direction, or whether the excitation pattern has become 0000, is checked at a step 184.

Since the change is in the forward direction for the first 11 shift pulses, the program proceeds to a step 185, at which the excitation pattern that follows the excitation pattern of drive pulses outputted last by the second control unit 50, namely an excitation pattern advanced by one step in the forward direction, is delivered to the stepping motor. When the first control unit 40 enters the tracking routine, the input excitation pattern varies in either the forward or reverse direction. If the change is in the forward direction, then the excitation pattern obtained by advancing the last-outputted excitation pattern one step in the forward direction is delivered (step 185), as described above. If the change is in the reverse direction, then an excitation pattern which is one step back from the last-outputted excitation pattern in the reverse direction is delivered (step 186).

The drive pulses entering the second control unit 50 from the first control unit 40 are not applied directly to the stepping motor 14. The excitation pattern of drive pulses entering from the first control unit 40 is used only for the purpose of sensing whether the pattern has changed and, if so, whether the change is in the forward or reverse direction. In the second control unit 50, the drive pulses delivered to the stepping motor 14 are produced so as to match the drive pulses outputted last, that is, so as form a continuum with the drive pulses outputted last. This assures that the stepping motor 14 will rotate smoothly at all times.

When the excitation pattern that arrives from the first control unit 40 becomes 0000, forward-feed processing executed by the first control unit 40 ends. As a result, the final excitation pattern outputted by the second control unit 50 is stored in the area $P_0$ (step 187) and processing is executed for transmitting the reverse-feed signal and storing the present position of the magnetic head (steps 147, 148).

It goes without saying that phase matching of the drive pulses is performed in substantially the same manner in reverse-direction random access. Step 142A would be modified to read "Output $12(N-1)$ pulses in direction treating an initial excitation pattern that which is one step back in the reverse direction from the excitation pattern stored in area $P_0$"; step 144 to read "Transmit REV signal"; step 182 to read "Output excitation pattern which is one step back in the reverse direction from the excitation pattern stored in area $P_0$"; and step 147 to read "Transmit FWD signal".

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling a stepping motor comprising first and second control units each for generating excitation patterns of pulses for driving a stepping motor, the excitation patterns of pulses generated by said first unit being applied to said second unit, which in turn applies all of said excitation patterns of pulses to the stepping motor, said second unit comprising:

means for storing an excitation pattern of pulses last outputted to said stepping motor;

decision means for deciding whether an excitation pattern of pulses applied by said first unit has changed; and pulse generating means operable in response to a change detected by said decision means for outputting excitation patterns of pulses forming a continuum with the stored excitation pattern of pulses last outputted.

2. The control apparatus as defined in claim 1, wherein said decision means detects a change in the excitation pattern of pulses applied by said first unit in a forward and reverse direction, and in response, said pulse generating means outputs excitation patterns of pulses forming a continuum with the stored excitation pattern of pulses outputted last in the forward and reverse directions, respectively.

3. In an apparatus for controlling a stepping motor including control means for generating an output signal in the form of excitation patterns of pulses for driving said stepping motor in forward and reverse directions in response to a control signal, a fast-feed controller comprising:

memory means for storing a previously output one of said excitation patterns of pulses supplied to said stepper motor;

input means for receiving said output signal of said excitation patterns of pulses from said control means;

logic means for detecting a change in said excitation patterns of pulses received by said input means; and pulse generating means for generating a motor drive signal of said excitation patterns of pulses responsive to said logic means detecting a change in said input excitation patterns of pulses, said pulse generating means generating said excitation patterns of pulses of said motor drive signal so as to form a continuum with said stored excitation pattern of pulses and supplying said motor drive signal to said stepping motor.

* * * * *